United States Patent
Zimmer et al.

(10) Patent No.: US 8,286,169 B2
(45) Date of Patent: Oct. 9, 2012

(54) DYNAMIC SCHEDULING AN INTERVAL FOR POLLING DEVICES BASED ON A CURRENT OPERATIONAL POWER MODE IN AN EXTENSIBLE FIRMWARE INTERFACE ARCHITECTURE

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 1486 days.

(21) Appl. No.: 11/156,089

(22) Filed: Jun. 17, 2005

(65) Prior Publication Data

US 2006/0288349 A1 Dec. 21, 2006

(51) Int. Cl.
*G06F 9/46* (2006.01)
*G06F 1/00* (2006.01)
*G06F 1/26* (2006.01)

(52) U.S. Cl. ......... 718/102; 718/100; 713/300; 713/320

(58) Field of Classification Search ................. 718/107, 718/104, 103; 709/220, 203; 710/57, 46, 710/2
See application file for complete search history.

(56) References Cited

U.S. PATENT DOCUMENTS

| | | | | |
|---|---|---|---|---|
| 6,449,663 B1 * | 9/2002 | Carney et al. | ...... | 710/15 |
| 6,640,268 B1 * | 10/2003 | Kumar | ...... | 710/46 |
| 6,877,081 B2 * | 4/2005 | Herger et al. | ...... | 711/170 |
| 6,898,751 B2 * | 5/2005 | Aikawa et al. | ...... | 714/748 |
| 6,931,460 B2 * | 8/2005 | Barrett | ...... | 710/57 |
| 6,944,687 B2 * | 9/2005 | Doragh et al. | ...... | 710/46 |
| 7,093,141 B2 * | 8/2006 | Elnozahy et al. | ...... | 713/300 |
| 7,263,605 B2 * | 8/2007 | Rothman et al. | ...... | 713/2 |
| 7,426,582 B1 * | 9/2008 | Ilyasov et al. | ...... | 710/2 |
| 2003/0074601 A1 * | 4/2003 | Schultz et al. | ...... | 714/15 |
| 2003/0142690 A1 * | 7/2003 | Beser | ...... | 370/432 |
| 2005/0066006 A1 * | 3/2005 | Fleck et al. | ...... | 709/206 |

OTHER PUBLICATIONS

Rothman, Michael A. et al., U.S. Appl. No. 11/022,598 Entitled "Low Power Firmware", filed Dec. 22, 2004.
Intel Corporation, "Extensible Firmware Interface Specification", Version 1.10, Dec. 1, 2002, pp. 5-13 to 5-14.
Microsoft Corporation, "Guidelines for Providing Multimedia Timer Support", available at www.microsoft.com/whdc/system/CEC/mm-timer.mspx, Sep. 20, 2002.
Compaq Computer Corporation et al., "Advanced Configuration and Power Interface Specification", Revision 2.0, Jul. 27, 2000, 418 pages.

* cited by examiner

*Primary Examiner* — Meng An
*Assistant Examiner* — Tammy Lee
(74) *Attorney, Agent, or Firm* — Barnes & Thornburg, LLP

(57) ABSTRACT

In some embodiments, the invention involves a platform-based firmware to provide a programmable scheduling timer interval. Dynamic scheduling intervals for non-interrupt driven device drivers and services utilize polling to determine device activity. In at least one embodiment, the disclosed subject matter reduces power consumption of a platform by decreasing the frequency of the system timer-tick when the platform is running in a lower power state. Other embodiments are described and claimed.

19 Claims, 3 Drawing Sheets

DYNAMIC SCHEDULING AN INTERVAL FOR POLLING DEVICES BASED ON A CURRENT OPERATIONAL POWER MODE IN AN EXTENSIBLE FIRMWARE INTERFACE ARCHITECTURE

FIELD OF THE INVENTION

An embodiment of the present invention relates generally to computing systems and, more specifically, to dynamic scheduling intervals for non-interrupt driven device drivers and services which utilize polling to determine device activity and balance performance of a polled driver model with power dissipation associated with a higher frequency operation.

BACKGROUND INFORMATION

Various mechanisms exist for reducing power consumption of a platform. Standard technology for power management is specified in Advanced Configuration and Power Interface (ACPI) version 2.0, which may be found on the public Internet at URL www-acpi-info (note that periods have been replaced with dashes to avoid unintentional hyperlinks in this document). ACPI is the standard most computer systems currently use for power management and is used to describe how the system looks to the operating system. Power management capabilities enable a platform, both at component and system level, to change its operating state to use less power and to resume normal operations. These modes of operation are often called sleep and wake modes. A number of events may trigger a platform to transition to low power state or to transition from a low power state to a more active state. For instance, moving a mouse, pressing a key on the keyboard or receiving a message may cause a platform to transition to an active state from a sleep, or low power, state.

The role of firmware in power management has been typically that the firmware may initiate stand-by or wake events. Often the policy of whether an event should wake or sleep the platform is dictated by the operating system (OS). The firmware will comply with the OS policy.

A typical scenario in existing systems is described herein. The platform is powered up. The firmware initializes the subsystem and eventually loads the OS. While the OS is running, at some point in time, a sleep event is triggered in the platform, perhaps due to time, or inactivity, or user-selection. The OS may trigger a system management interrupt (SMI) to cause a sleep event. The firmware acts upon the SMI and recognizes that the platform is to be put into sleep mode. The firmware initiates sleep mode. The chipset for the platform is programmed to recognize certain actions for triggering wake events. When an event causing a wake event is recognized, the firmware operates once again to wake the platform. The waking of a platform may be similar to boot up, but varies according to ACPI standards. Memory contents should still be intact and the operational context should be maintained. If the processor was in sleep mode, upon waking, the processor resets and re-launches the firmware. The firmware can detect that it is not in boot up mode, because in some sleep modes, memory remains intact. Thus, the firmware executes a process dedicated to waking the platform rather than rebooting it. The firmware will not reinitialize memory, for instance. Once awakened, the firmware transitions control to the operating system.

Some platforms may utilize an extensible firmware interface (EFI) architecture. The Extensible Firmware Interface (EFI) Framework technology, or any implementation of the Extensible Firmware Interface, provides a pre-Operating system (pre-OS) runtime environment. EFI is a specification which defines a new model for the interface between operating systems and platform firmware, commonly known as Basic Input Output System (BIOS). The specification version 1.10, published Dec. 1, 2002, is available on the public Internet at URL developer-intel-com/technology/efi/main_specification.htm. The framework may be found at www-intel-com/technology/framework. The interface consists of data tables that contain platform-related information, plus boot and runtime service calls that are available to the operating system and its loader. Together, these provide a standard environment for booting an operating system and running pre-boot applications.

The EFI specification is primarily intended for the next generation of Intel® Architecture and Itanium® Architecture-based computers, and is an outgrowth of the "Intel Boot Initiative" (IBI) program that began in 1998. More information about EFI can be found at http://developer.intel.com/technology/efi/.

Legacy BIOS is typically tailored for a specific platform. EFI was developed to allow the operating system (OS) to operate generically and without communicating directly to the platform. EFI is effectively the middle layer between the OS and the platform. The layer beneath the EFI is implemented as BIOS, which is specific to the platform. The layer above EFI exposes the interface with which the OS communicates. When the system boots up and the OS assumes control, the OS is handed the EFI system table by the OS loader. The EFI system table is a data structure with pointers to other tables, or data structures. Some of these data structures contain a set of function pointers. The collections of functions pointed to by these tables are known as the runtime and boot services. Other data structures contain platform information such as the Advanced Configuration and Power Interface (ACPI) tables.

EFI implementations are typically non-interrupt driven environments. A typical OS has interrupt driven Input/Output (I/O). When an I/O device has incoming data, it generates a hardware interrupt. A multi-threaded OS can handle I/O interrupts concurrently with foreground processing. However, EFI utilizes a polled environment. At a pre-defined periodic timer-tick, or scheduling interval, the device drivers poll the I/O devices to see if there is any incoming data, or any data to send. A downside to polling is that the high performance I/O is limited by how often the timer-tick occurs. If the timer-tick is not often enough, incoming data may be lost. The network interface card (NIC) may not be able to keep up with the bandwidth. An advantage of polling is that polling is a small feature that is relatively easy to deploy. Implementing a general interrupt abstraction at the EFI layer (pre-OS, or boot environment, for example) is very difficult.

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to dynamically changing a scheduling interval based on operation heuristics. The scheduling interval defines the frequency of polling for devices having I/O. In at least one embodiment, the present invention is intended to reduce power consumption of a platform by decreasing the frequency of the system timer-tick when the platform is running in a lower power state.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Figure 1:
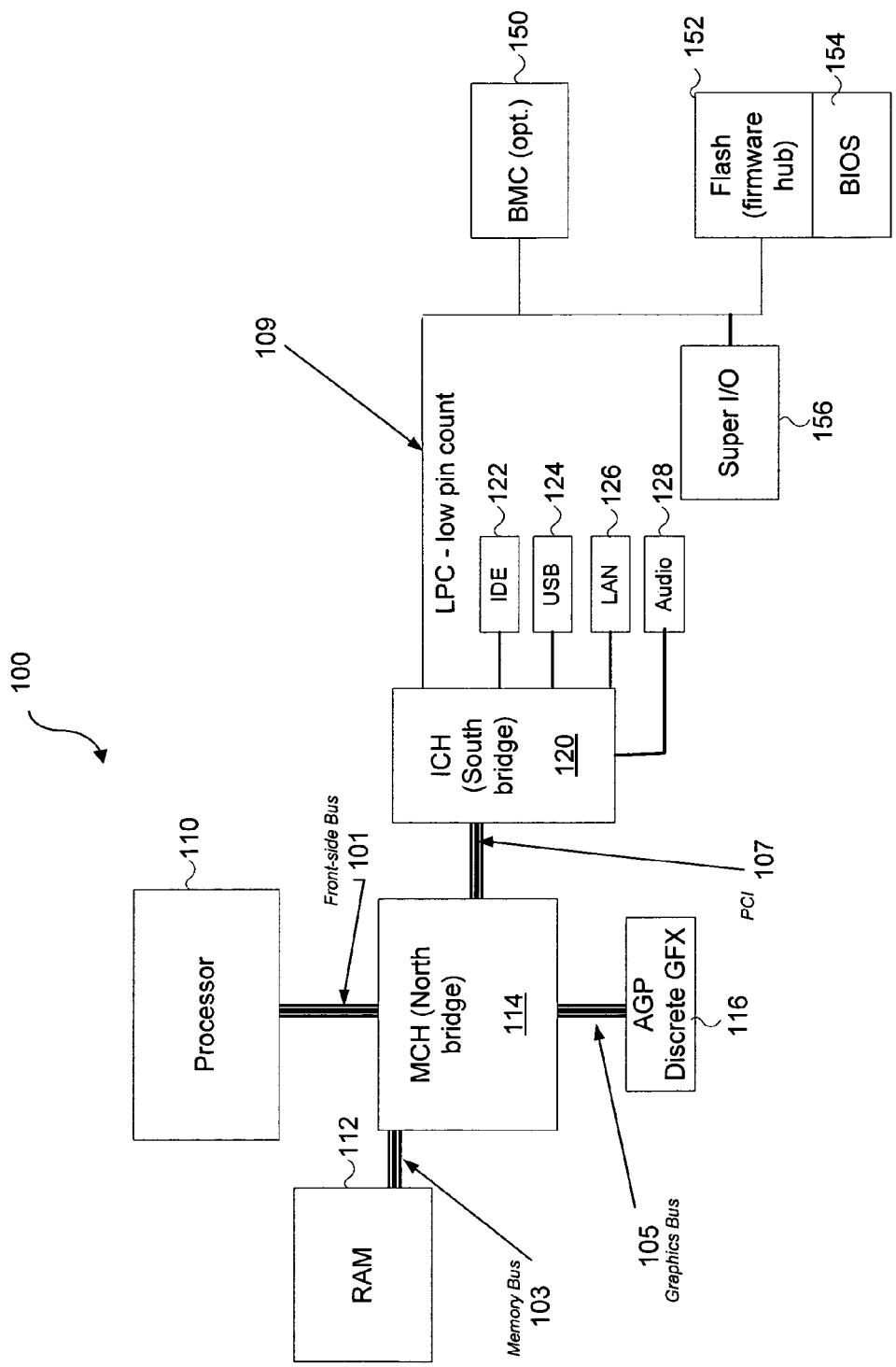
FIG. 1 is a block diagram of an exemplary processing environment in which embodiments of the invention may be practiced.

FIG. 1 is a block diagram of an exemplary system 100 upon which the disclosed system and method may be implemented. Processor 110 communicates with a memory controller hub (MCH) 114, also known as North bridge, via the front side bus 101. The MCH 114 communicates with system memory 112 via a memory bus 103. The MCH 114 may also communicate with an advanced graphics port (AGP) 116 via a graphics bus 105. The MCH 114 communicates with an I/O controller hub (ICH) 120, also known as, South bridge, via a peripheral component interconnect (PCI) bus 107. The ICH 120 may be coupled to one or more components such as PCI hard drives (not shown), legacy components such as IDE 122, USB 124, LAN 126 and Audio 128, and a Super I/O (SIO) controller 156 via a low pin count (LPC) bus 156.

Processor 110 may be any type of processor capable of executing software, such as a microprocessor, digital signal processor, microcontroller, or the like. Though FIG. 1 shows only one such processor 110, there may be one or more processors in platform hardware 100 and one or more of the processors may include multiple threads, multiple cores, or the like.

Memory 112 may be a hard disk, a floppy disk, random access memory (RAM), read only memory (ROM), flash memory, or any other type of medium readable by processor 110. Memory 112 may store instructions for performing the execution of method embodiments of the present invention.

Non-volatile memory, such as Flash memory 152, may be coupled to the IO controller via a low pin count (LPC) bus 109. The BIOS firmware 154 typically resides in the Flash memory 152 and boot up will execute instructions from the Flash, or firmware.

In some embodiments, platform 100 is a server enabling server management tasks. This platform embodiment may have a baseboard management controller (BMC) 150 coupled to the ICH 120 via the LPC 109.

In some embodiments, EFI may be used for operational environments other than boot. For example, it may be desirable to use EFI for a manageability environment. It may also be possible for a system to use EFI as the operational environment, without another OS, like the Windows® OS. Thus, it is desirable to balance the polled vs. interrupt models with respect to power requirements.

Continuing to run a high frequency timer-tick on a laptop system, for instance, is wasteful when the laptop lid is closed. A scalable timer-tick may be used to balance reduced power requirements and yet continue to utilize the simple polling method for I/O.

In an embodiment of the disclosed subject matter, the timer-tick may be parameterized and scaled dynamically during operation of a system. When the system is in standby, sleep, or another reduced power mode, the timer-tick may be set to a lower frequency, for instance, once per second (1 Hz). When the system is awakened or brought to a higher power mode, the timer-tick may be set to a higher frequency, for instance, 1000 times per second.

Figure 2:
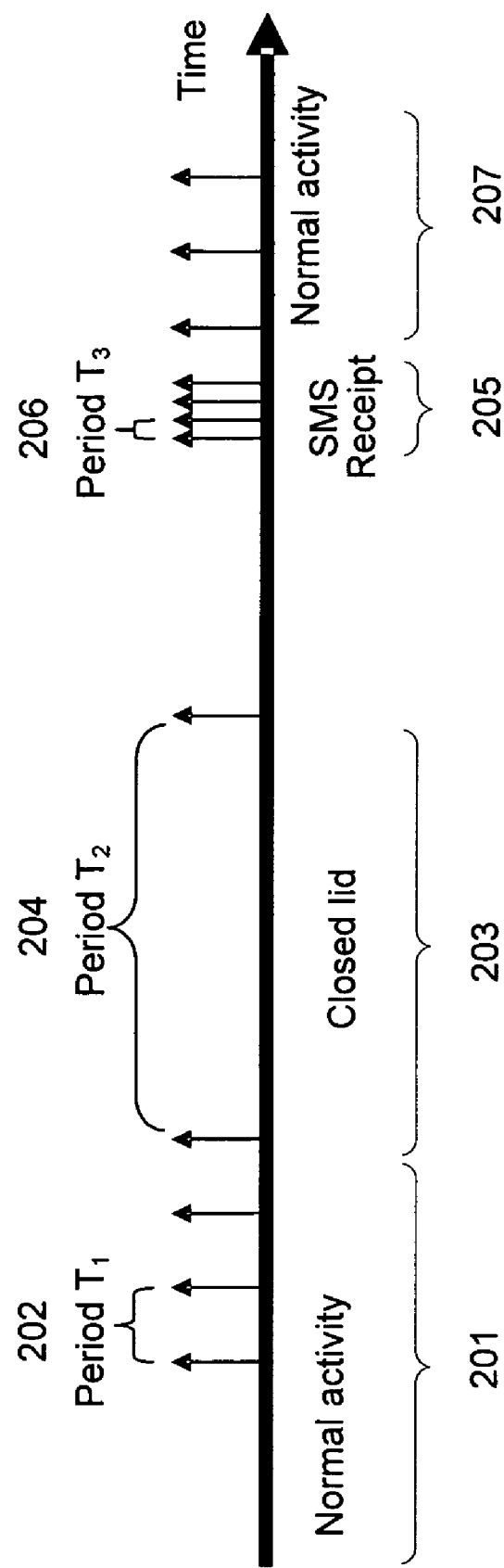
FIG. 2 illustrates how various operational modes affect a preferred scheduling interval, according to embodiments of the invention.

FIG. 2 illustrates a timeline for a platform in a variety of operational modes, and having various frequency timer-ticks. The platform may be in a normal operational mode 201 and 207, have a closed lid and be in sleep mode 203, or be in receipt of short message service (SMS) messages for high speed I/O 205. During normal operational mode 201, 207, it may be desirable for the timer-tick to be set at a medium frequency (Period $T_1$) 202. In normal mode, activities are not expected to occur more frequently than the timer-tick. When the platform is in sleep or other low power modes 203, it may be desirable for the timer-tick to be set at an ultra-low frequency (Period $T_2$) 204. In low power mode, activities are not expected to occur more frequently than the timer-tick $T_2$. When the platform receives an SMS message or other high speed I/O is being performed, it may be desirable to set the timer-tick to a much higher frequency $T_3$ 206, to ensure that data is not lost. Heuristic policies may be set for varying power states and usage models to dynamically vary the timer-tick, or scheduling interval, based on current need.

Legacy PCs typically use a timer-tick, but in a different fashion. In order to communicate with an I/O device, an interrupt is generated. In the interrupt handler a flag is set and the code that is not in the handler polls for the flag. Thus, legacy PCs suffer from the inefficiencies of both timers and polling. They use interrupts but are not multi-threaded devices. Thus, if a process wants to read from a disk in a legacy BIOS environment, a command is sent to the disk. The process polls a flag, waiting for the flag to be set in memory. The interrupt handler sets this flag. In these legacy BIOS systems, interrupts are used, but no advantage is derived from this use.

In an EFI environment, the drivers poll the devices and can request a "callback" at specific intervals for it to poll the device. The callbacks typically occur at the timer-tick. For instance, a system could have 50 device drivers, all polling a different piece of hardware. No hardware interrupts need to be supported in the EFI mode. Only a single timer-tick policy must be implemented. An advantage to EFI over legacy BIOS is that device drivers are more easily written using timer-ticks than interrupts.

One embodiment of the disclosed subject matter may be implemented on a platform with power management hardware. A platform with power management hardware is capable of multiple power states. Existing systems that use power management hardware may use the Intel® Enhanced Speed Step® (EIST) model. The Itanium® Processor Family (IPF) is also implemented with power management hardware.

An EFI environment may be used for preparing to boot the operating system, but it may also be used as a stand-alone runtime environment in its own right. For example, a firmware phase manageability environment may choose to use the EFI Framework for a runtime environment (RTE). As such, low-power considerations are very important for environments where MIPS/Watt materially affect the platform cost. In addition, EFI and an EFI-based environment provide an application regime wherein an OS-absent user interface management model may be deployed.

In order to realize the benefits of EFI in these environments, there are some structural changes that need to be precipitated. Specifically, EFI, like most operational environments (e.g., Windows®, Linux) has a fixed scheduling tick. This may be the ubiquitous 18.2 ticks/second, or some variant thereof. The OS, in turn, builds a model of time abstraction and scheduling based upon this fixed value. The same holds true for EFI, where the time interval for the EFI timer-tick is a simple "#define" in a .h file. Embodiments of the invention modify this system requirement and make the timer-tick interval become a parameterized variable.

The polled I/O model of EFI makes device drivers quite portable, but it necessitates a sufficiently high-resolution timer-tick in order to service the I/O transactions, such as incoming packets on a network interface, etc. This high-frequency tick is antithetical to low-power operation (e.g., CMOS dissipates power while switching, wake-events dissipate more power than maintaining the sleep state, etc). The disclosed subject matter may diffuse the parameterized tick into all of the time-keeping abstractions so that there is no deleterious effect on software compatibility, user-experience, or performance based upon this model.

Another embodiment where a variable timer-tick would be desirable follows. An existing platform may have a 1000-BaseT connection from which data-grams can be managed with a tick of 50 Hz. However, the hardware is hot-upgraded to a 1000-BaseT connection/NIC and the software auto-detects the change and programmatically updates the timer-tick to 200 Hz resolution. Without a programmable scheduling interval, the upgrade will cause many data packets to be lost, because the 1000-BaseT connection requires a timer-tick more frequent than 50 Hz.

In an embodiment, a platform may stay in a lower power state during various operations. Copending U.S. Application Sr. No. 11/022,598, to Michael A. Rothman et al., entitled "Low Power Firmware," and assigned to a common assignee, describes a platform that notifies the user of received e-mail via an LCD display. While servicing the console input/output, EFI needs to have a 10 Hz timer-tick to provide usable responsiveness, but when the user walks away, it may be desirable to have the system change the timer-tick to 0.001 Hz (e.g., Spartan polling for activity). This latter scenario may be used in conjunction with a device-specific Interrupt Service Routine (ISR), whose only role may be to wake-up the device in response to an input or specific network packet, and change the timer-tick from 0.001 Hz to some 10's of Hz in order to service the newly discovered I/O transactions. When e-mail arrives, a notification is displayed on an LCD visible when the laptop lid is still closed. It may be desirable to utilize an EFI environment with a similar usage model. However, because EFI polls devices rather than being interrupt driven, it is desirable to maintain a low power state and set a timer-tick such that power is minimized and no data is lost between timer-ticks.

One way to ensure that no data is lost is for the device driver to poll more often. In embodiments of the invention, the EFI timer-tick is set to run more often for certain states or operational uses of the platform. When the state changes, or the operational load changes, the timer-tick may be set to a lower frequency.

In embodiments of the invention, when there is work to be done, the timer-tick may be set at a relative high frequency to ensure no I/O is missed. When the platform is in a sleep/standby or low power mode, the timer-tick may be set to a lower frequency to save power. The timer-tick may be changed dynamically based on what the user needs. One embodiment may cause the platform to enter a low power state in between timer-ticks. OSs are capable of similar activities. When there is no work to be done an OS may transition to low power state. When an interrupt occurs, the platform is brought out of the low power state. OSs rely on interrupts to wake the platform and exit a lower power state. Existing OSs do not have polled driver models.

The timer-tick parameter may be set during driver execution environment (DXE) or during EFI core operation (firmware services).

Figure 3:
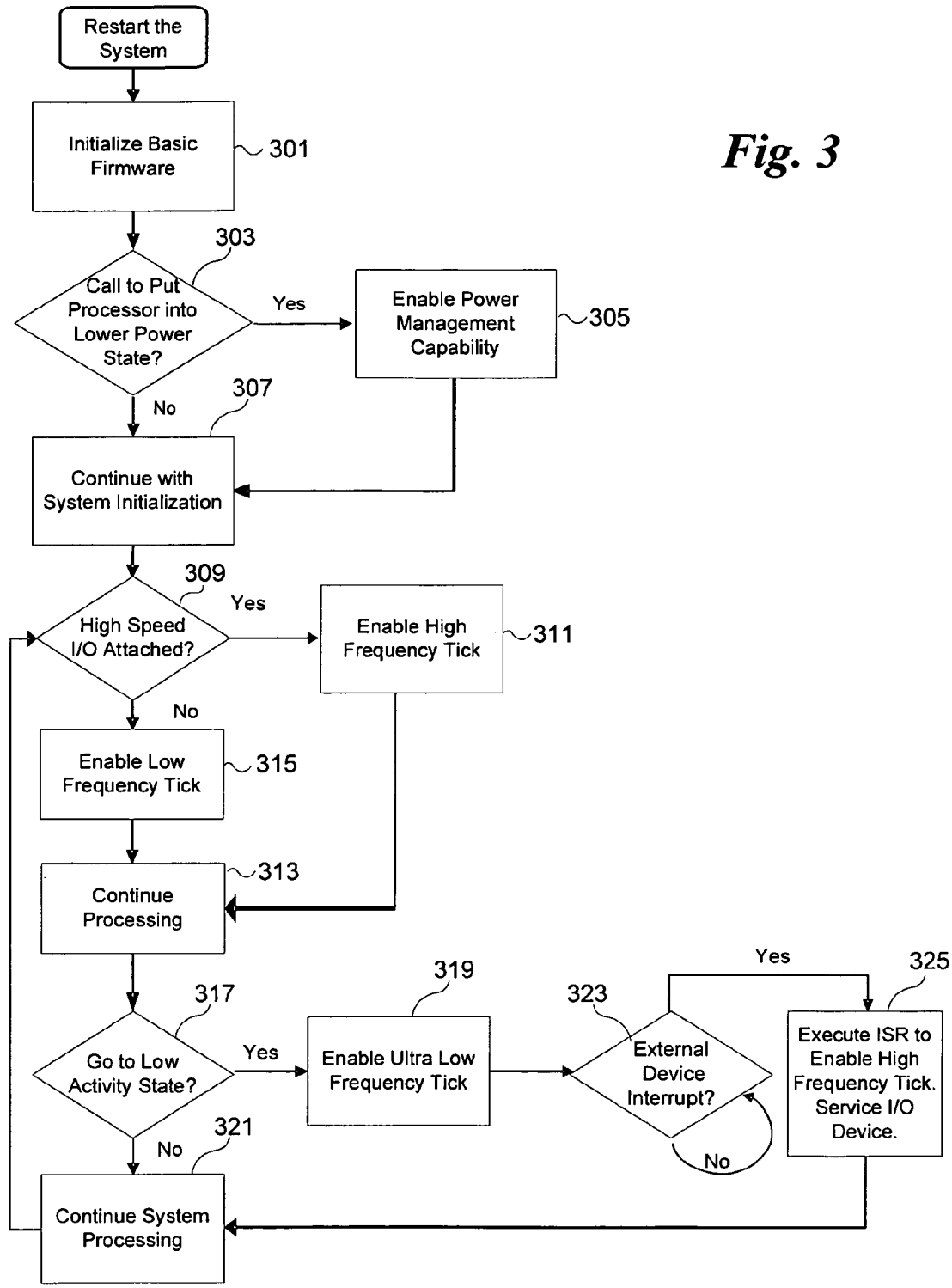
FIG. 3 is a flow diagram illustration an exemplary method for adjusting dynamic scheduling intervals, according to embodiments of the invention.

FIG. 3 is a flow diagram illustrating the method of an exemplary embodiment of the invention. First, the system is restarted and basic firmware initialization is performed in 301. This may include memory initialization, pre-EFI initialization (PEI) and initialization of PCI buses. A determination is made as to whether the platform has power management hardware 303. If the processor has power management architecture 303, then the functionality is enabled 305 and processing continues with system initialization 307. If not, then processing continues with system initialization 307.

A determination is then made as to whether high speed I/O, for instance, a high speed NIC, is used or if there is user interaction in 309. If so, then a higher frequency timer-tick may be enabled 311. If not, then a lower speed timer-tick may be enabled in 315. In both cases, once the timer-tick is set, processing continues at 313. If the processor is put into a lower activity state, as determined at block 317, then the timer-tick may be set to an ultra-low frequency in block 319. If not, processing continues at 321. If the timer-tick has been set to ultra-low frequency, a determination is made as to whether an external device interrupt is received, in block 323. If not, the system continues to wait for an interrupt to increase the frequency of the timer-tick. If an interrupt has been received, then the corresponding interrupt service routine (ISR) may be executed to enable a higher frequency timer-tick in block 325. The I/O device may be serviced by the ISR, as well.

Once the timer-tick has been set higher, a short message service (SMS) message may be received (see 205, FIG. 2). In some embodiments, two levels of timer-tick frequencies may be implemented, i.e., high and low. In other embodiments, three levels of timer-tick frequencies may be implemented, i.e., high, low, and ultra-low. It will be apparent to one of ordinary skill in the art that other embodiments may implement more levels based on operation heuristics.

The techniques described herein are not limited to any particular hardware or software configuration; they may find applicability in any computing, consumer electronics, or processing environment. The techniques may be implemented in hardware, software, or a combination of the two. The techniques may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, that may include a processor, a storage medium accessible by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks or portions thereof may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
    running, by a processor, an extensible firmware interface (EFI) architecture;
    enabling a dynamic scheduling interval in the processor, the scheduling interval to be used for scheduling an interval for polling a plurality of devices communicatively coupled to the processor;
    determining a current scheduling interval based on a current operational power mode of the processor, wherein the current scheduling interval is maintained as a parameterized variable by the EFI;
    polling the plurality of devices, by an EFI firmware service, at the determined current scheduling interval; and
    determining whether the current operational power mode of the processor has changed;
    determining an adjusted scheduling interval based on the changed operational power mode of the processor, wherein the adjusted scheduling interval comprises a scheduling interval having an increased interval relative to the current scheduling interval when the processor is in a low power state; and
    polling the plurality of devices, by the processor, at the determined adjusted scheduling interval.

2. The method as recited in claim 1 wherein determining the adjusted scheduling interval further comprises determining a scheduling interval having a decreased interval relative to the current scheduling interval when the processor is in one of (a) a higher power state, (b) at least one of the plurality of devices requires more frequent polling, and (c) an external device interrupt is received.

3. The method as recited by claim 1, wherein determining the current scheduling interval comprises:
    using pre-determined heuristic policies to determine a preferred scheduling interval; and
    dynamically adjusting the current scheduling interval to substantially match the preferred scheduling interval, the adjusting to occur while the processor is operating.

4. The method as recited by claim 3, wherein the processor is operating in an environment controlled by EFI firmware services, wherein the current scheduling interval is maintained as a parameterized variable by the EFI.

5. The method as recited in claim 3, wherein the processor operates in an environment that is any one of pre-boot, post-operating system (post-OS) or a stand-alone EFI environment.

6. The method as recited in claim 3, wherein the scheduling interval is diffused as a parameterized timer tick into timekeeping abstractions running on the processor, thereby avoiding any deleterious effect on software compatibility, user-experience, and system performance.

7. The method as recited by claim 1, further comprising:
    dynamically adjusting the current scheduling interval without requiring a re-boot of the processor.

8. The method as recited by claim 1, wherein the operational power mode is defined by a current power state of the processor, a new power state of the processor when transitioning to a power state other than the current power state of the processor, throughput requirements of the plurality of devices, and user interaction with the processor and the plurality of devices.

9. The method as recited in claim 1, further comprising:
    setting an initial current scheduling interval during a boot phase of either (a) driver execution environment (DXE) or (b) EFI core operation of firmware services.

10. A machine readable tangible storage medium having instructions stored thereon, the instructions when executed on a processor of a machine having an extensible firmware interface (EFI) architecture, cause the machine to:
    dynamically adjust a scheduling interval in the machine, the scheduling interval to be used for scheduling an interval for polling a plurality of devices;
    determine a current scheduling interval based on a current operational power mode of the processor of the machine, wherein the current scheduling interval is maintained as a parameterized variable by the EFI;
    poll the plurality of devices, by an EFI firmware service, at the determined current scheduling interval; and
    determine whether the current operational power mode of the processor has changed;
    determine an adjusted scheduling interval based on the changed operational power mode of the processor, wherein the adjusted scheduling interval comprises a scheduling interval having an increased interval relative to the current scheduling interval when the machine is in a low power state; and poll the plurality of devices, by the processor, at the determined adjusted scheduling interval.

11. The medium as recited in claim 10, wherein the adjusted scheduling interval comprises a scheduling interval having an decreased interval relative to the current scheduling interval when the machine is in one of (a) a higher power state, (b) at least one of the plurality of devices requires more frequent polling, and (c) an external device interrupt is received.

12. The medium as recited by claim 10, wherein determining the current scheduling interval comprises instructions that when executed cause the machine to:

determine a preferred scheduling interval using pre-determined heuristic policies; and dynamically adjust the current scheduling interval to match the preferred scheduling interval while the machine is operating.

13. The medium as recited by claim 10, further comprising instructions that when executed cause the machine to:

dynamically adjust the current scheduling interval without requiring a re-boot of the processor.

14. The medium as recited by claim 10, wherein the operational power mode is defined by a current power state of the machine, a new power state of the machine when transitioning to a power state other than the current power state of the machine, throughput requirements of the plurality of devices, and user interaction with the machine and the plurality of devices.

15. A system comprising:

a platform comprising a processor, chipset and a plurality of ancillary components, the processor configured to run an extensible firmware interface (EFI) architecture;

a firmware coupled to the processor, the firmware comprising a plurality of EFI services, the firmware further comprising at least one non-interrupt driven device driver, the at least one non-interrupt driven device driver to poll a corresponding device for activity, the polling to occur at a current scheduling interval, wherein the current scheduling interval is maintained as a parameterized variable by the EFI; and a dynamic scheduler to adjust the current scheduling interval based on an operational power mode of the processor, wherein the dynamic scheduler to adjust the current scheduling interval when a change in the operational power mode of the processor is detected, and wherein the dynamic scheduler is to increase the current scheduling interval when the processor is in a low power state, and wherein the at least one non-interrupt drive device driver to poll the corresponding device for activity at the adjusted current scheduling interval.

16. The system as recited in claim 15, wherein the dynamic scheduler is to decrease the current scheduling interval when the processor is in one of (a) a higher power state, (b) at least one corresponding device requires more frequent polling, and (c) an external device interrupt is received.

17. The system as recited by claim 15, wherein the dynamic scheduler uses pre-determined heuristic policies to determine a preferred scheduling interval and dynamically adjusts the current scheduling interval to substantially match the preferred scheduling interval while the processor is operating.

18. The system as recited in claim 15, wherein the dynamic scheduler adjusts the current scheduling interval without requiring a re-boot of the processor.

19. The system as recited in claim 15, wherein the operational mode is defined by a current power state of the processor, a new power state of the processor when transitioning to a power state other than the current power state of the processor, throughput requirements of the plurality of devices, and user interaction with the processor and the plurality of devices.

* * * * *